(12) United States Patent
Smith et al.

(10) Patent No.: US 10,574,407 B2
(45) Date of Patent: Feb. 25, 2020

(54) WIRELESS LOCAL AREA NETWORK COMMUNICATIONS BETWEEN AIRBORNE AND GROUND DEVICES

(71) Applicant: SR Technologies, Inc., Davie, FL (US)

(72) Inventors: Graham K. Smith, Boca Raton, FL (US); Conrad C. Smith, Parkland, FL (US); Ryan Busser, Fort Lauderdale, FL (US)

(73) Assignee: SR Technologies, Inc, Sunrise, FL (US)

( * ) Notice: Subject to any disclaimer, the term of this patent is extended or adjusted under 35 U.S.C. 154(b) by 35 days.

(21) Appl. No.: 15/937,314

(22) Filed: Mar. 27, 2018

(65) Prior Publication Data

US 2018/0294928 A1 Oct. 11, 2018

Related U.S. Application Data

(60) Provisional application No. 62/484,151, filed on Apr. 11, 2017.

(51) Int. Cl.
| | |
|---|---|
| *H04W 52/02* | (2009.01) |
| *H04L 1/18* | (2006.01) |
| *H04B 7/185* | (2006.01) |
| *H04W 74/08* | (2009.01) |
| *H04W 84/12* | (2009.01) |

(52) U.S. Cl.
CPC ....... *H04L 1/1893* (2013.01); *H04W 52/0206* (2013.01); *H04B 7/18502* (2013.01); *H04L 1/188* (2013.01); *H04W 74/0816* (2013.01); *H04W 84/12* (2013.01); *Y02D 70/00* (2018.01); *Y02D 70/10* (2018.01); *Y02D 70/14* (2018.01); *Y02D 70/142* (2018.01); *Y02D 70/446* (2018.01)

(58) Field of Classification Search
CPC ............. H04B 7/18502; H04L 1/1893; H04W 52/0206; H04W 74/0816; H04W 84/12; Y02D 70/00; Y02D 70/10; Y02D 70/14; Y02D 70/142; Y02D 70/446
USPC ........................................................ 370/311
See application file for complete search history.

(56) References Cited

U.S. PATENT DOCUMENTS

| | | | | |
|---|---|---|---|---|
| 2016/0323426 A1* | 11/2016 | Hedayat | ........... | H04W 28/0268 |
| 2017/0105213 A1* | 4/2017 | Seok | ................. | H04W 74/0816 |
| 2017/0272345 A1* | 9/2017 | Viorel | ................... | H04W 8/005 |
| 2018/0115305 A1* | 4/2018 | Islam | ................... | H04B 7/0695 |
| 2018/0288806 A1* | 10/2018 | Roccapriore | ..... | H04W 74/0816 |
| 2019/0155312 A1* | 5/2019 | Tam | ...................... | B64C 39/024 |

* cited by examiner

*Primary Examiner* — Robert J Lopata
(74) *Attorney, Agent, or Firm* — Christopher & Weisberg, P.A.

(57) ABSTRACT

A method and device are disclosed that enable communication between an airborne STA and a ground based AP in the presence of a multitude of other ground based networks that would normally cause such interference that communication would not be possible. A succession of control packets are sent prior to an air to ground communication such that the ground based networks delay their traffic allowing the wanted acknowledgment packet to be received. A succession of control packets are sent followed by a PS poll or data null packet prior to a ground to air communication such that the wanted ground to air packet is sent at a known time and the other ground based networks delay their traffic allowing the wanted ground to air packet to be received.

20 Claims, 15 Drawing Sheets

WIRELESS LOCAL AREA NETWORK COMMUNICATIONS BETWEEN AIRBORNE AND GROUND DEVICES

CROSS REFERENCE TO RELATED APPLICATION

This application is related to and claims priority to U.S. Provisional Patent Application No. 62/484,151, entitled WLAN COMMUNICATIONS BETWEEN AIRBORNE AND GROUND DEVICES," filed Apr. 11, 2017, the entirety of which is incorporated herein by reference.

STATEMENT REGARDING FEDERALLY SPONSORED RESEARCH OR DEVELOPMENT

N/A.

FIELD

Wireless local area network (WLAN) device communications.

BACKGROUND

The Institute of Electronic and Electrical Engineers (IEEE) Standard 802.11-2016 is a reference related to this disclosure of which the entire contents are incorporated herein by reference. The IEEE 802.11 Standard is commonly referred to as "Wi-Fi". A Wi-Fi network generally includes of an access point (AP) and a number of stations (STA).

The Standard describes the medium access scheme used in Wi-Fi. The basic medium access scheme used in Wi-Fi is CSMA/CA (carrier sense multiple access with collision avoidance). CSMA/CA reduces the probability of collisions between multiple STAs accessing the radio medium. When the medium becomes idle following a busy medium situation, the highest probability of a collision exists. This is because multiple STAs may be waiting for the medium to become idle again. In this situation the random back off procedure as defined by the CSMA/CS protocol is used to resolve the medium contention.

Note that CS, carrier sense, is the function that determines if the medium is busy or idle. The virtual CS mechanism is achieved by distributing reservation information announcing the impending use of the medium. The Duration/ID field in individually addressed frames is used to distribute the medium reservation information and this field gives, for example, the time that the medium is reserved to the end of the acknowledgment (ACK) frame sent in response to the initial frame. Another means of distribution of this medium reservation information is the exchange of RTS (ready to send) and CTS (clear to send) frames prior to a data frame, using the Duration/ID field to indicate the total medium reservation required to complete the data packet and ACK exchange following the RTS, CTS exchange. A further way to distribute this medium reservation is by the transmission of CTS frames alone. In the latter case, the medium reservation time can be set to cover an extended period. The network allocation vector (NAV) is an indicator, maintained in each station and access point, of time periods when transmission onto the wireless medium may not be initiated and this value is set by the virtual CS mechanism and the received duration values in the Duration/ID field.

There is also a physical CS mechanism that indicates that the medium is busy if any energy above a set, i.e., predetermined, level is detected at the antenna connector of the Wi-Fi device. There are differing details of the physical CS for the individual PHY (physical) specifications in the Standard. Basically, if the medium is busy, as indicated by the CS function, then a Wi-Fi device shall not transmit. The back off procedure is used before a packet is transmitted where a random delay is used after the packet is presented for transmission and the packet is actually transmitted.

FIG. 1 is a schematic diagram depicting a Wi-Fi airborne station 10 (also referred to as STA 10) that is receiving transmissions from a multitude of Wi-Fi access points and stations, 120, 130 and 140, within a coverage area 110 which is compatible with the antenna coverage of the airborne station 10. In the example depicted in FIG. 1, the airborne station 10 is attempting to communicate with one particular ground based access point 120, which in this example is an access point (AP). Within the coverage area 110 at the same time that ground based AP 120 is transmitting it is extremely likely that a number of other devices, 140, are also transmitting. Therefore at the airborne station 10 a number of unwanted transmissions 160 are being simultaneously received in addition to the wanted transmission 150. This multiple reception has two major consequences. First, the wanted transmission 150 cannot be successfully decoded at airborne station 10 due to the interference from the unwanted transmissions 160, and second, the airborne station 10 will be prevented from transmitting due to the CS determining that the medium is effectively always busy. The more networks that are in the coverage area 110, the worse the situation. If there are only a few networks, or the traffic is light, then it is possible that the CS function may periodically indicate an idle medium. A problem is when the traffic is such that the interference prevents any ground based transmissions from ground based AP 120 to airborne station 10 to be successfully received and that the CS function indicates an effectively permanent busy medium.

FIG. 2 is a timing diagram that further describes by example why airborne station 10 cannot transmit if there are a number of active networks in the coverage area 110. FIG. 2 depicts a number of ground based networks, networks 1 to 8, 201 to 208 respectively, together with examples of packets, 210, 220, 221, 222, 230, 240, 250 251, 260, 261, 262, 270. 271, 280, 281 and 282 that the networks are actively transmitting. As the networks 1 to 8, in this example, are ground based then it is assumed that they are not overlapping and hence may transmit simultaneously whereas, as airborne station 10 is airborne it does receive all of the transmissions. In this example, at time T1 295, transmission 220, from network 2 202, transmission 230, from network 3 203 and transmission 260 from network 6 206 are all being received at airborne station 10. Similarly at time T2 296, packets 210, 221, 250 261 270 and 280, from networks 1 (201), 2 (202), 5 (205), 6 (206) 7 (207) and 8 (208) respectively are all being received at airborne station 10. Similarly, in this example, at times T3 297, T4 298 and T5 299 there are multiple simultaneous transmissions and furthermore, it can be readily observed that at no time is the medium idle as seen by the airborne station 10. As a result, the CS will indicate medium busy continuously 290 at the airborne station 10. Hence airborne station 10 is unable to cause a transmission to the Wi-Fi ground based AP 120.

FIG. 3 depicts a method that may be used to enable airborne station 10 to send a transmission to ground based AP 120. This method is commonly used in ground based networks where there may be overlapping networks. The networks 1 to 8, 201 to 208 and the traffic in those networks is the same as previously shown in FIG. 2. At time t1, 311, the medium busy indication 209 at airborne station 10 is forced low 305 by a control in the airborne station 10, overriding the CS mechanism. Airborne station 10 then transmits a CTS packet 320 at time t2 312. The CTS packet contains a duration field value that is intended to reserve the medium for a time that covers the transmission of the subsequent data or management packet 330 from airborne station 10 plus the resultant ACK 340 expected from ground based AP 120. In this example, the CTS packet 320 will cause packets 210, 221, 240, and 261 to be delayed to time t6 316 as each of those networks receives the CTS and obeys the virtual NAV set by the CTS duration. The data or management packet 330 (hereafter sometimes referred to as data packet or management packet 330) from airborne station 10 at time t3, 313, also contains a duration field value that is intended to reserve the medium until the end of the expected ACK 340 that is sent after the data packet 330 is correctly received. In this example, this duration value will additionally cause packets 240 and 241 to be delayed. Ground based AP 120 receives the data or management packet 335 and, assuming it is correctly decoded, ground based AP 120 transmits the ACK 340 at time t5, 315. In this example, at the same time that the ACK 340 is transmitted by ground based AP 120, packet 251 is also being transmitted in network 5, 205, because packet 250 prevented both the CTS packet 320 and the data packet 330 from being received by network 5, 205, and hence the duration field value was not decoded and the NAV not set. Similarly packets 271 and 282 are also being transmitted because packets 270 and 280 prevented the reception of the CTS packet 320 and data or management packet 330 from being correctly received in networks 7 (207) and 8 (208) respectively. Hence, the ACK 340, transmitted by ground based AP 120 at time t5, 315 is highly likely to be blocked at airborne station 10 and as a result, airborne station 10 will interpret that the data or management packet 330 failed.

FIG. 4 depicts an example of ground based AP 120 attempting to transmit a packet 410 to the airborne station 10. Packet 410 may be a data or a management packet. For simplicity in the following explanation it is assumed that it is a data packet. The networks 1 to 8, 201 to 208 and the traffic in those networks is the same as previously shown in FIG. 2. As ground based AP 120 is a ground based device, it is assumed that it does not receive packets from the other networks, 1 to 8, 201 to 208. Therefore for ground based AP 120 the medium is idle and it may transmit. However, at the time that ground based AP 120 transmits the data packet 410 to airborne station 10, other ground based networks are already transmitting, namely packets 221, 250, 270 and 280. The likelihood is therefore that airborne 10 will not receive or be able to decode packet 410. Ground based AP 120 therefore will not receive an ACK for packet 410 and will retry the packet 411 after a random delay. At this time interference from packets 240, 261, 270 and 281 are also in the process of transmission and again the likelihood is that airborne station 10 will not receive or be able to decode packet 411. A subsequent retry, 412 after another random delay will also likely fail due to packets 251, 262, and 282. In practice, the possibility of a successful transmission from ground based AP 120 to airborne station 10, when ground based AP 120 is contained in a coverage area 110 where there are a multitude of other Wi-Fi networks, is very low.

SUMMARY

Methods and Wi-Fi airborne stations are provided for transmitting a data packet to a Wi-Fi ground based access point. According to one aspect, a method for transmitting one of a data packet and a management packet from a Wi-Fi airborne station to a Wi-Fi ground-based access point is provided. The method includes, prior to transmitting the one of the data packet and the management packet from the Wi-Fi airborne station to the Wi-Fi ground-based access point: transmitting by the Wi-Fi airborne station a series of at least three control packets separated in time and containing in their duration/ID fields, time values that extend beyond a time required to start transmission of the one of the data packet and the management packet, transmitting by the Wi-Fi airborne station the one of the data packet and the management packet to the Wi-Fi ground-based access point, and receiving at the Wi-Fi airborne station an acknowledgment control packet transmitted by the Wi-Fi ground-based access point in response to the one of the data packet and the management packet.

According to this aspect, in some embodiments, a power save (PS) bit in a Frame Control field is set in all packets transmitted by the Wi-Fi airborne station. In some embodiments, the control packets transmitted by the Wi-Fi airborne station are clear to send (CTS) packets. In some embodiments, the CTS control packets transmitted by the Wi-Fi airborne station are addressed to the Wi-Fi ground-based access point. In some embodiments, the control packets transmitted by the Wi-Fi airborne station are ready to send (RTS) packets addressed to the Wi-Fi ground-based access point. In some embodiments, the control packets transmitted by the Wi-Fi airborne station are a mixture of clear to send (CTS) packets addressed to either one of the Wi-Fi airborne station and the Wi-Fi ground-based access point and ready to send (RTS) packets addressed to the Wi-Fi ground-based access point.

According to another aspect, a method for receiving one of a data packet and a management packet transmitted from a Wi-Fi ground-based access point to a Wi-Fi airborne station is provided. The method includes setting a power save (PS) bit in a Frame Control field in all packets transmitted by the Wi-Fi airborne station. Prior to receiving the one of the data packet and the management packet transmitted from the Wi-Fi ground-based access point to the Wi-Fi airborne station: the method includes transmitting by the Wi-Fi airborne station a series of at least three control packets separated in time and containing in their duration/ID fields, time values that extend beyond the time required to transmit a further control trigger frame by the Wi-Fi airborne station and the subsequent transmission by the Wi-Fi ground-based access point of the one of the data packet and the management packet that is triggered by the control trigger frame, transmitting by the Wi-Fi airborne station a control trigger packet addressed to the Wi-Fi ground-based access point, receiving at the Wi-Fi airborne station the one of the data packet and the management packet transmitted by the Wi-Fi ground-based access point, and transmitting by the Wi-Fi airborne station the acknowledgement control packet to the data or management packet transmitted by the Wi-Fi ground-based access point.

According to this aspect, in some embodiments, the control trigger packet transmitted by the Wi-Fi airborne station addressed to the Wi-Fi ground-based access point is a PS-Poll. In some embodiments, the control trigger packet transmitted by the Wi-Fi airborne station addressed to the Wi-Fi ground-based access point is a data null. In some embodiments, the control packets transmitted by the Wi-Fi airborne station are clear to send (CTS) packets. In some embodiments, the CTS control packets transmitted by the Wi-Fi airborne station are addressed to the Wi-Fi ground-based access point. In some embodiments, the control packets transmitted by the Wi-Fi airborne station are ready to send (RTS) packets addressed to the Wi-Fi ground-based access point. In some embodiments, the control packets transmitted by the Wi-Fi airborne station are a mixture of clear to send (CTS) packets addressed to either one of the Wi-Fi airborne station and the Wi-Fi ground-based access point and ready to send (RTS) packets addressed to the Wi-Fi ground-based access point.

According to yet another aspect, a Wi-Fi airborne station for transmitting one of a data packet and a management packet to a Wi-Fi ground-based access point is provided. The Wi-Fi airborne station includes a memory configured to store the one of the data packet and the management packet. The airborne station also includes processing circuitry configured to: prior to transmitting the one of the data packet and the management packet from the Wi-Fi airborne station to the Wi-Fi ground-based access point, transmit by the Wi-Fi airborne station a series of at least three control packets separated in time and containing in their duration/ID fields, time values that extend beyond a time required to start transmission of the one of the data packet and the management packet, transmit by the Wi-Fi airborne station the one of the data packet and the management packet to the Wi-Fi ground-based access point, and receive at the Wi-Fi airborne station an acknowledgment control packet transmitted by the Wi-Fi ground-based access point in response to the one of the data packet and the management packet.

According to this aspect, in some embodiments, a power save (PS) bit in a Frame Control field is set in all packets transmitted by the Wi-Fi airborne station. In some embodiments, the control packets transmitted by the Wi-Fi airborne station are clear to send (CTS) packets. In some embodiments, the CTS control packets transmitted by the Wi-Fi airborne station are addressed to the Wi-Fi ground-based access point. In some embodiments, the control packets transmitted by the Wi-Fi airborne station are ready to send (RTS) packets addressed to the Wi-Fi ground-based access point. In some embodiments, the control packets transmitted by the Wi-Fi airborne station are a mixture of clear to send (CTS) packets addressed to either one of the Wi-Fi airborne station and the Wi-Fi ground-based access point and ready to send (RTS) packets addressed to the Wi-Fi ground-based access point. In some embodiments, before the acknowledgement control packet is transmitted by the Wi-Fi ground-based access point, a power save (PS) poll packet is transmitted to the Wi-Fi ground-based access point.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

This disclosure relates to communications between access points (AP) and stations (STA) that are based upon the IEEE 802.11 technology, commonly known as Wi-Fi. Embodiments of this disclosure relate to communications between an airborne STA and a ground based AP in the presence of other ground based Wi-Fi networks. In accordance with embodiments discussed herein, a succession of control packets are sent prior to an air to ground communication such that the ground based networks delay transmission of their traffic, thereby allowing the desired acknowledgment packet to be received. A succession of control packets are sent followed by a PS poll or data null packet prior to a ground to air communication such that the wanted ground to air packet is sent at a known time and the other ground based networks delay transmission of their traffic thereby allowing the desired ground to air packet to be received.

Figure 2:
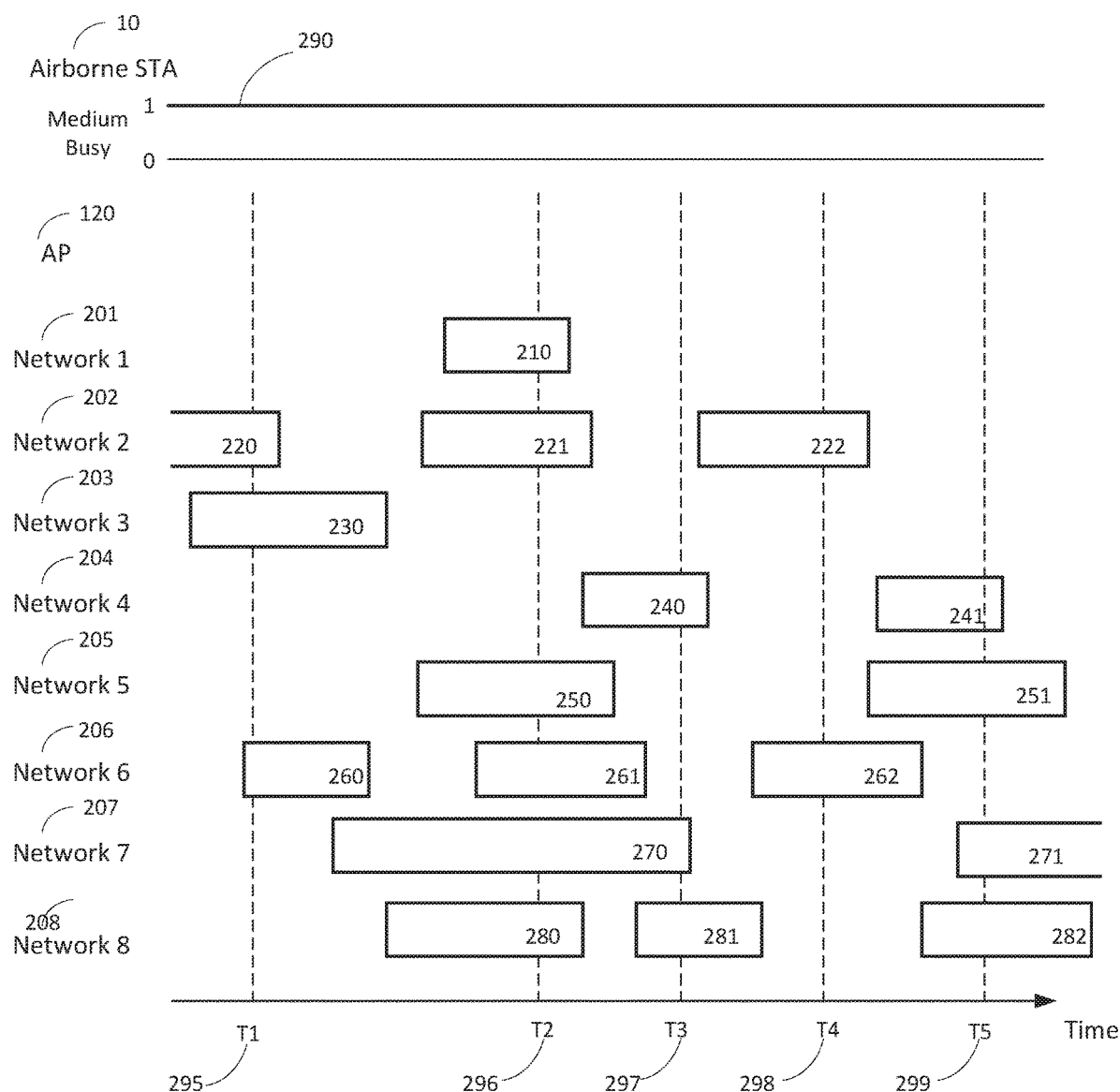
FIG. 2 is a timing diagram that further describes by example why airborne station cannot transmit if there are a number of active networks in the reception area.
Figure 3:
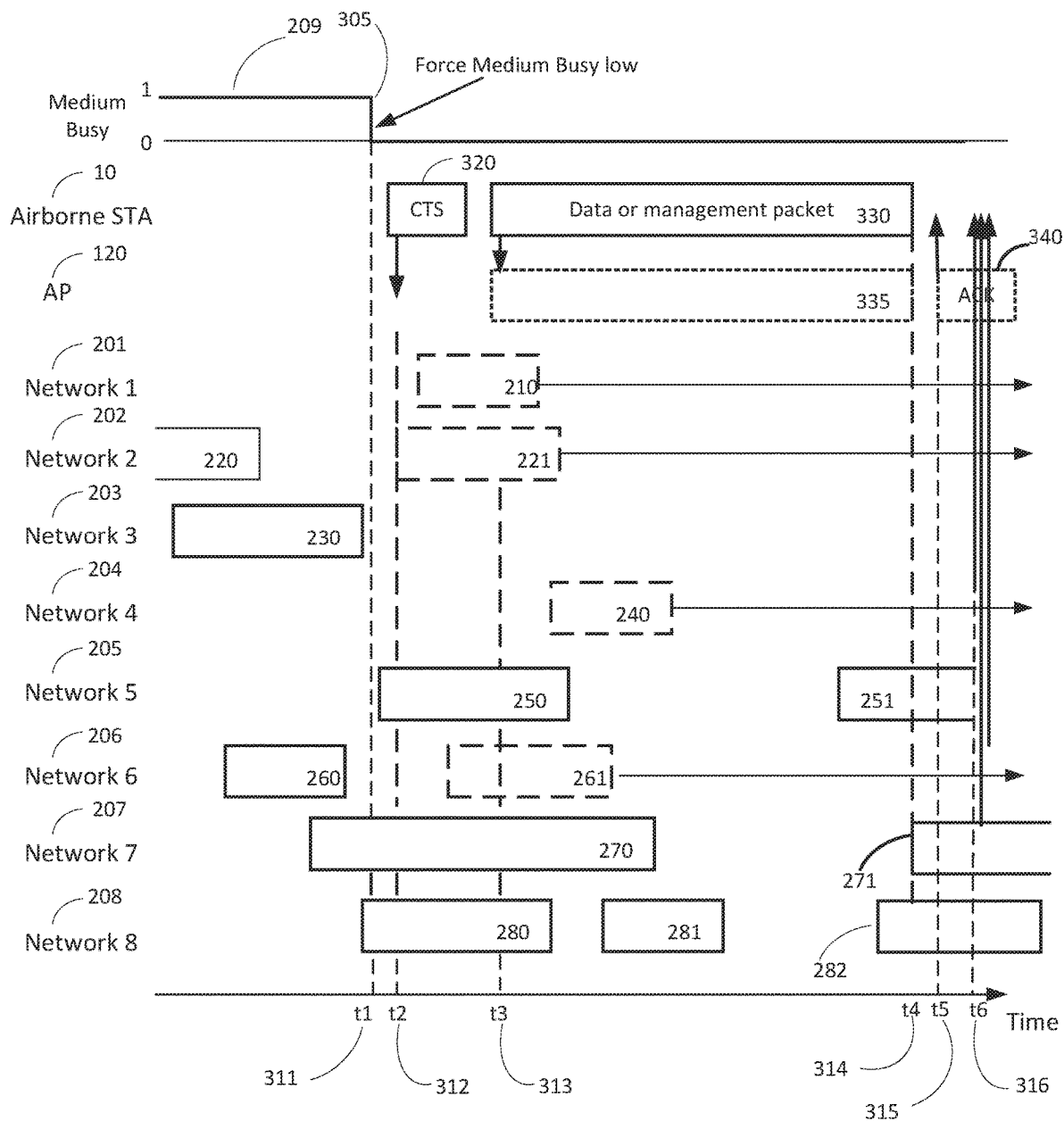
FIG. 3 depicts a common method that may be used to enable an airborne station to send a transmission to the ground based AP.
Figure 5:
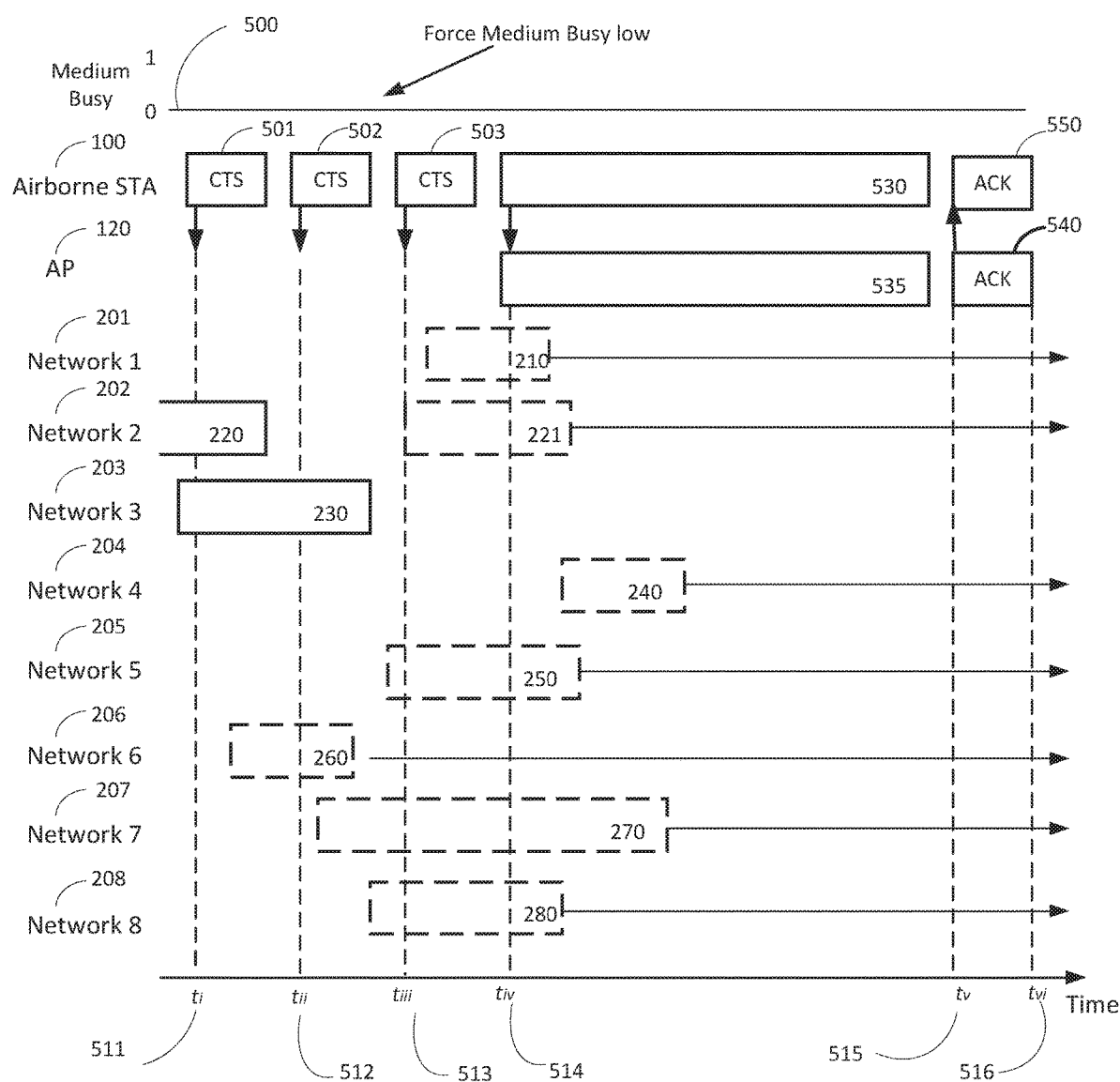
FIG. 5 is an exemplary embodiment of the disclosure for the case that the airborne STA is attempting to transmit a packet to the ground based AP.

FIG. 5 is an exemplary embodiment of the disclosure for the case where the airborne Wi-Fi airborne station 100 is attempting to transmit a packet 530 to the ground based AP 120. The packet 530 may be a data or a management packet but for simplicity, the following description assumes that it is a data packet. In order to quiet the medium, at time ti 511, airborne station 100 forces its medium busy control 500 low and transmits the first of a series of CTS transmissions. As previously shown in FIG. 3, a single CTS is unlikely to quiet the medium such that the Ack sent by the ground based AP 120 in response to a data packet sent by airborne station 100 is received correctly. Therefore a succession of CTS transmissions are sent by the airborne station 100 prior to the data packet 530. In the example depicted in FIG. 5, airborne station 100 sends three CTS packets, 501, 502 and 503 at times ti 511, tii 512 and tiii 513 respectively, followed by the data transmission 530 at time tiv 514. The duration values set in the CTS packets 501, 502 and 503 must extend to at least the start of the data packet 530, at time tiv 514. It is not necessary to be precise, and a larger value may be used without adverse consequence, as is explained below. Assume for example that CTS packets 501 sets its duration value to 10 ms. Then assume that CTS 502 is transmitted 1 ms after CTS packets 501 and sets its duration value to 9 ms. CTS 503 is then transmitted 1 ms after CTS 502 and sets its duration value to 8 ms. Then assume that data packet 530 is transmitted 1 ms after CTS 503, the duration value set in data packet 530 will be automatically set to the time required to receive the ACK 550. The data packet 530 will be received by all the ground based networks and hence, at time tvi 516 the NAVs for those networks will be reset, irrespective of the duration values set into the CTS packets 501, 502 and 503. In this case, using the same example traffic in networks 1 to 8, 201 to 208 as previously shown in FIG. 2 and FIG. 3, each of the networks 1 to 8 effectively delay their transmissions and there is no interference at airborne station 100 to the received ACK 550 as a result of the transmitted ACK 540 from ground based AP 120.

Figure 4:
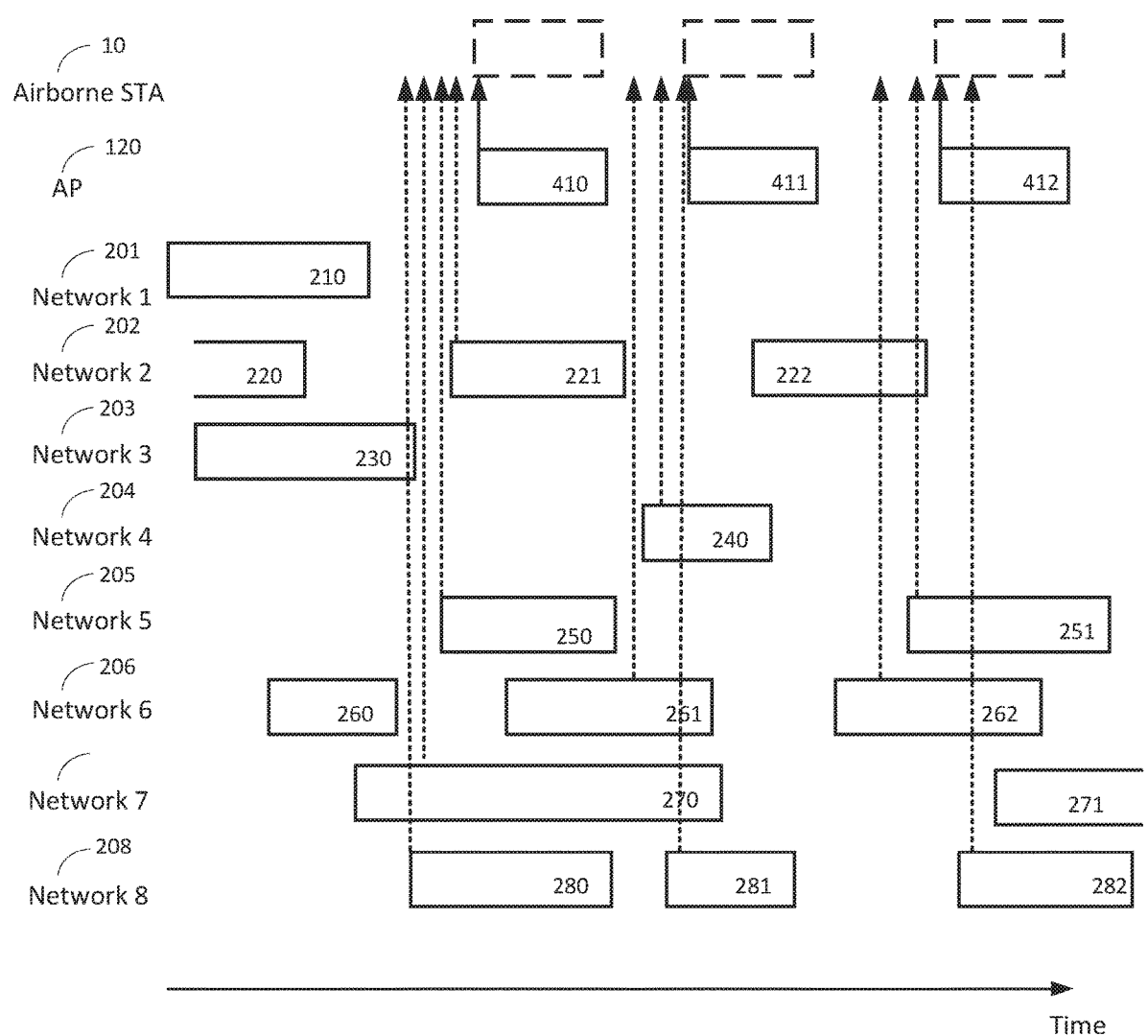
FIG. 4 depicts an example of a ground based AP attempting to transmit a packet to the airborne STA.

As described in FIG. 4, the possibility of a successful transmission from ground based AP 120 to airborne station 100, when ground based AP 120 is contained in a coverage area 110 where there are a multitude of other Wi-Fi networks is very low due to the interference from other networks in the coverage area 110. Similar to the scheme described in FIG. 5, in order for airborne station 100 to receive a transmission from the ground based AP 120 it is necessary that the transmissions from the surrounding networks are delayed. This, as shown in FIG. 5 can be achieved by sending a succession of CTS transmissions. In the case of a packet being transmitted by the ground based AP 120 to the airborne station 100, however, it is not generally known at what time the packet is to be transmitted. Simply sending many CTS transmissions, stopping all the other traffic for a relatively long period of time and then waiting for the transmission is undesirable as it would cause denial of service to those networks. In addition, the CTS transmissions could also cause the transmission from the ground based AP 120 to also be delayed as the ground based AP would normally obey the duration times in the CTS transmissions (addressing the CTS packets to the ground based AP 120 can, however, often overcome this, but it is still not good practice to stop traffic for extended periods over a large area).

The basic power save scheme for Wi-Fi STAs is described in the Standard. A simplified description follows. A station indicates to the ground based AP to which it is associated that it is in power save mode by setting the "PS bit" to 1 in the Frame Control field in the header of a data or control frame. The ground based AP will then buffer any packets that are addressed to that station and advertise in its beacon that it has packets buffered for that station. A station in power save will wake periodically to receive beacons and hence will note if there are packets buffered for it. To retrieve one buffered packet the station sends a "PS Poll" control packet to the ground based AP which triggers the ground based AP to transmit the first buffered packet. The ground based AP will indicate if there are more packets buffered in the "More Data" field in the Frame Control field and the station may send subsequent PS Poll packets in order to retrieve them, one at a time. Of interest and relevance to this disclosure is that, by setting the PS bit, a station can cause the ground based AP to buffer any packet addressed to the station, and then by sending a PS Poll packet to an ground based AP, the ground based AP is triggered to send that buffered packet. Hence, the time that the packet is transmitted can be controlled.

Figure 6:
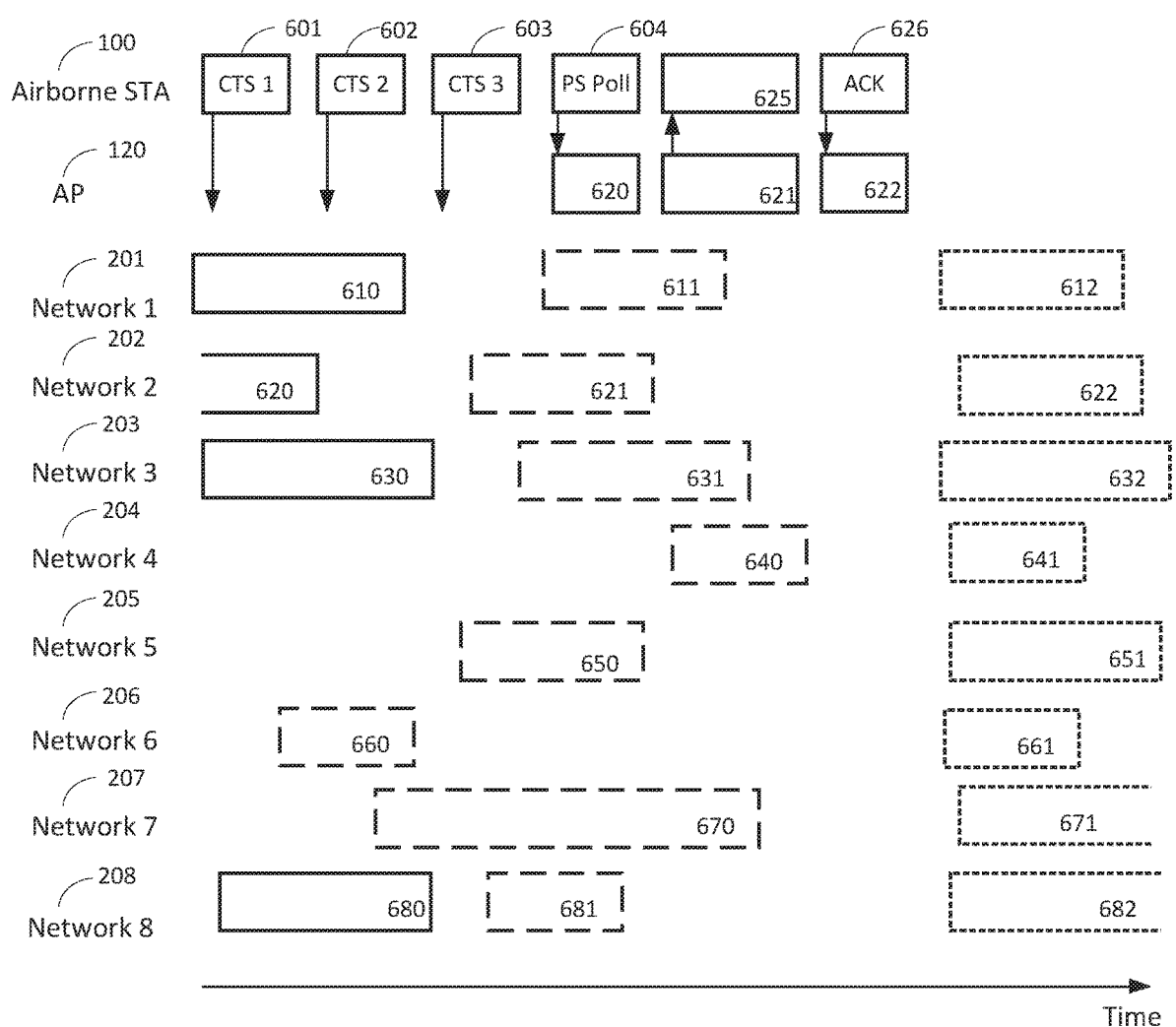
FIG. 6 is an exemplary embodiment of the disclosure for the case that the ground based AP needs to transmit a data packet 621 to the airborne.

FIG. 6 is an exemplary embodiment of the disclosure for the case that the ground based AP 120 needs to transmit a data packet 621 to the airborne station 100. The data packet 621 may be a data or a management packet but the following description assumes that it is a data packet. Airborne station 100 sets the PS bit in all control and data packets such that the ground based AP 120 assumes that airborne station 100 is in power save mode. Airborne station 100 need not actually be in power save mode and generally, in this situation, would not be, but it indicates to the ground based AP 120 that it is, to ensure that the ground based AP 120 buffers any packets addressed to airborne station 100. A number of CTS packets, 601, 602 and 603 are sent by airborne station 100 in order to delay any transmissions in the networks 1 to 8, 201 to 208, similar to that described in FIG. 4. For example, in Network 1, 201, without the CTS transmissions, both packets 610 and 611 would be transmitted. CTS packet 601 and CTS packet 602 do not delay packet 610 as it started prior to both of them. Packet 611, however, will be delayed due to CTS 603. Similarly data packets 621, 631, 640, 650, 660, 670 and 681 will all be delayed due to the duration settings in the three CTS packets 601, 602 and 603. Then airborne station 100 transmits a PS-Poll packet addressed to ground based AP 120 which is received as packet 620. Assuming that the ground based AP 120 has a data packet buffered for airborne station 100, the receipt of the PS Poll triggers ground based AP 120 to transmit data packet 621, received as packet 625 at the airborne station 100. Airborne station 100 will then transmit the ACK packet 626, received as packet 622 by ground based AP 120. Note that due to the CTS packets, 601, 602 and 603, the other ground network traffic has been delayed and the data packet 621 should be received without interference at airborne station 100. At the sending of the ACK packet 626, the NAV at each of the ground devices will be reset, thus the delayed packets will then be transmitted. For example, packet 611, delayed by CTS 603, will then be transmitted as packet 612, after the ACK packet 626 has been sent. Similarly data packets 621, 631, 640, 650, 660, 670 and 681 will be delayed and effectively transmitted as packets 622, 632, 641, 651, 661, 671 and 682 respectively, after the ACK packet 626 has been sent.

Figure 7:
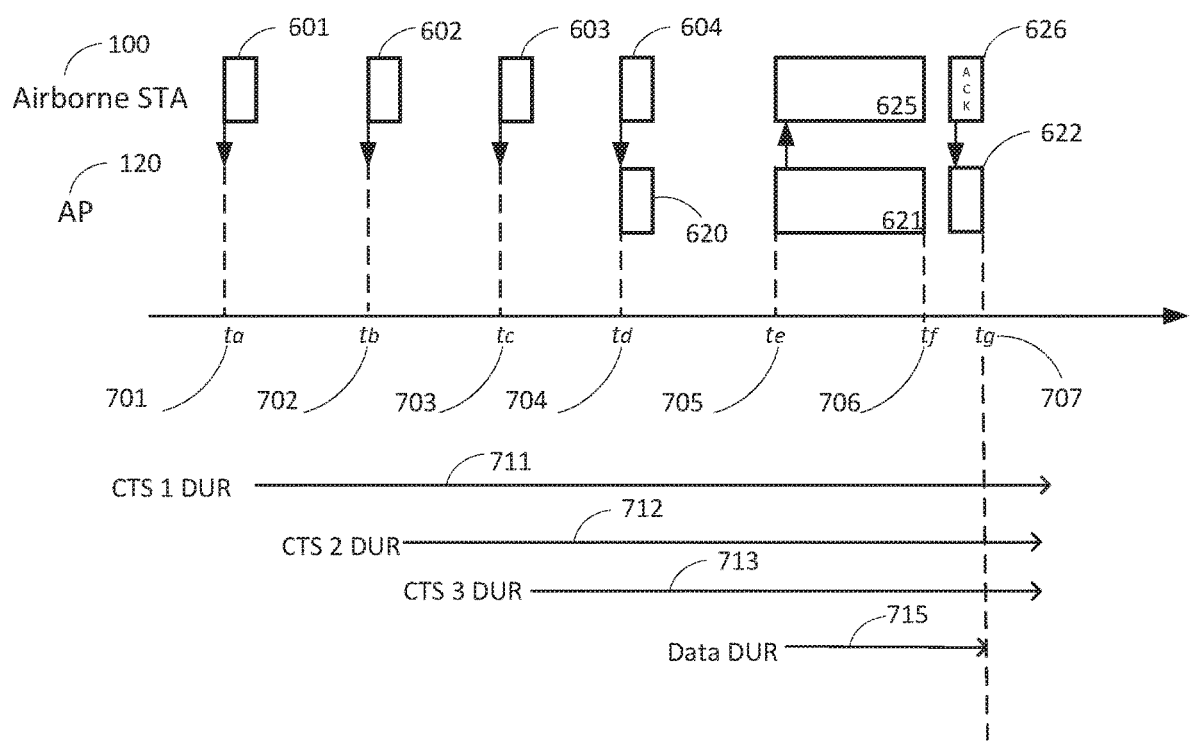
FIG. 7 is the timing diagram for FIG. 6 that shows the relative timing and setting of the duration fields for the CTS packets, the PS-Poll packet, the data packet and the ACK packet.

FIG. 7 is the timing diagram for FIG. 6 that shows the relative timing and setting of the duration fields for the CTS packets 601, 602 and 603, the PS-Poll packet 604, the data packet 621 and the ACK packet 626. Airborne station 100 transmits CTS packets 601 at time ta 701, CTS 602 at time tb 702 and CTS 603 at time tc 703. Airborne station 100 transmits PS-Poll packet 604 at time td 704. The timing of ta 701, tb 702, tc 703 and td 704 is under the control of airborne station 100. The gap between the PS-Poll packet 604 and the data packet 621, td 704 to te 705 is somewhat predictable as is the length in time of the data packet 621 and the resulting ACK packet 626. The duration 711 that is set into CTS packets 601 will be such that it extends beyond the time tf 706. In practice, relatively large duration values can be used as the sole purpose is to delay traffic in the other ground networks, 201 to 208. The transmission of the ACK packet 626 will reset the NAV for all the ground networks as previously explained, so there is no adverse effect to setting relatively high duration values in the CTS packets 601, 602 and 603. For example, the duration 711 of CTS packet 601 may be set to 10000 (10 ms). Then CTS 602 may be sent 1 ms after CTS packet 601, and the duration 712 of CTS packet 602 set to 9000 (9 ms). CTS 603 may be sent 1 ms after CTS packet 603, and the duration 713 of CTS packet 603 set to 8000 (8 ms). Alternatively, durations 711, 712 and 713 may all be set to the same value, 10000 for example (10 ms). PS-Poll packet does not contain a duration value. The durations 711, 712 and 713 need to extend beyond the time tf 706 such that there is no interference to the data packet 621 transmitted by ground based AP 120 and received as packet 625 by airborne station 100. The data packet 621 sent by the ground based AP 120 will have a duration 715 that covers only the expected ACK packet 626 which is transmitted by airborne station 100 but this is not received by the other ground based networks. The ACK packet 626 however will be received by the ground networks and hence their respective mediums will be then be returned to idle at time tg 707.

If the CTS packet 601, 602 and 603 are addressed to the airborne station 100 then the ground based AP 120 may interpret them as indicating that airborne station 100 is awake and hence prematurely send the buffered data. To prevent this, and also to ensure that the ground based AP 120 will transmit when triggered by the PS-Poll packet 604, the CTS packets 601, 602 and 603 are addressed to the ground based AP 120.

As previously described, the basic power save scheme used in Wi-Fi uses a PS-Poll control frame, transmitted by an airborne station 100, to trigger buffered packets at the ground based AP. An alternative and common variation on this is for the airborne station 100 to transmit a data null packet with the PS bit set to zero, in place of a PS-Poll, thus informing the ground based AP that the airborne station 100 is no longer in power save mode. The ground based AP will then assume the airborne station 100 is awake and will send any buffered packets. Once the airborne station 100 has received the data, it can then send another data null packet with the PS bit set to 1 and the ground based AP will assume that the airborne station 100 is again in power save mode.

Figure 8:
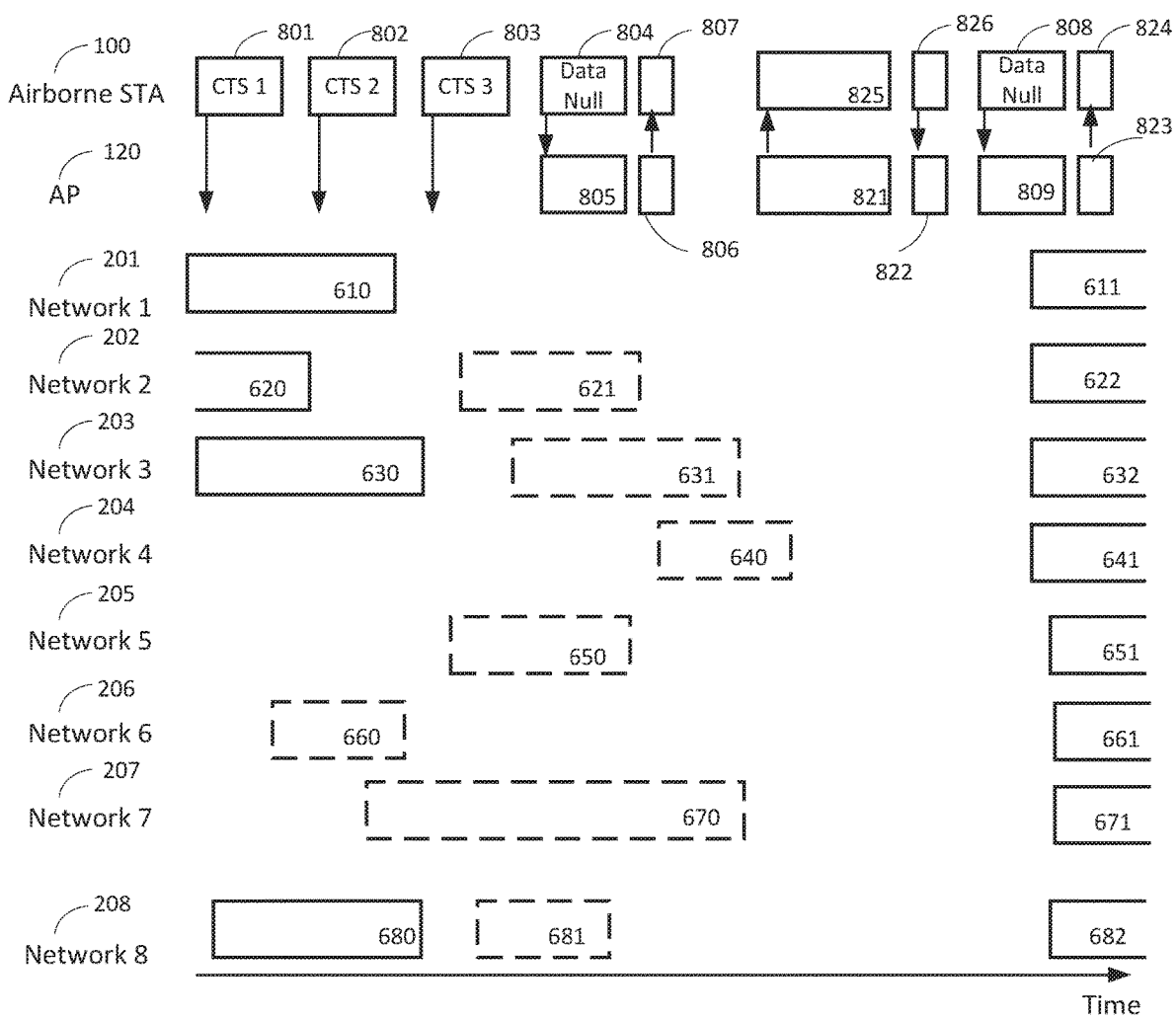
FIG. 8 is another exemplary embodiment of the disclosure for the case that the ground based AP needs to transmit a packet 821 to the airborne STA.

FIG. 8 is another exemplary embodiment of the disclosure for the case that the ground based ground based AP 120 needs to transmit a packet 821 to the airborne station 100. The packet 821 may be a data or a management packet but the following description assumes that it is a data packet. FIG. 8 is similar to FIG. 6 with the exception that a data null packet 804 is used in place of a PS-Poll packet 604 to trigger the ground based AP 120 to send the buffered data packet 821. Airborne station 100 sets the PS bit such that the ground based AP 120 assumes that airborne station 100 is in power save mode. Airborne station 100 need not actually be in power save mode and generally, in this situation, would not be, but it indicates to the ground based AP 120 that it is in order to ensure that the ground based AP 120 buffers any packets addressed to airborne station 100. A number of CTS packets, 801, 802 and 803 are sent by airborne station 100 in order to delay any transmissions in the networks 1 to 8, 201 to 208, similar to that described in FIG. 4 and FIG. 6. As previously described, data packets 621, 631, 640, 650, 660, 670 and 681 will all be delayed due to the duration settings in the three CTS packets 801, 802 and 803. Then airborne station 100 transmits a data null packet 804 addressed to ground based AP 120 which is received as packet 805. The PS bit in this data null packet 804 is set to zero and hence, assuming that the ground based AP 120 has a data packet buffered for airborne station 100, the receipt of this data null packet 805 triggers ground based AP 120 to first transmit an Ack 806 and then to transmit the buffered data packet 821, received as data packet 825 at the airborne station 100. Airborne station 100 will then transmit the Ack 826, received as packet 822 by ground based AP 120. Note that due to the CTS packets, 801, 802 and 803, the other ground network traffic has been delayed and the data packet 821 should be received without interference at airborne station 100. At the sending of the ACK 826, the NAV set at each of the ground devices will be reset thus the delayed packets will be transmitted, 622, 632, 641, 651, 661, 671 682 respectively after the Ack 826 has been sent and received by the ground networks, networks 1 to 8, 201 to 208. Having received the data packet 825 and transmitted the Ack 826, airborne station 100 will then transmit another data null packet 808 to ground based AP 120 with the PS bit set to 1 such that ground based AP120 responds with an Ack 823 and then assumes that the airborne station 100 is again in power save mode. It should be noted that by sending a data null packet with the PS bit set to 0, the ground based AP 120 will assume that the airborne station 100 is awake and will send all buffered packets. After the first transmission, the Ack 826 will release the NAV times and any subsequent buffered packets may be lost due to interference. The ground based AP 120 will indicate in the "More Data" bit in the Frame Control field if there are more packets. Assuming that these extra buffered packets are not successfully received at airborne station 100, they will simply reach the retry limit. In this case then the process may be restarted by airborne station 100, repeating the CTS and data null transmissions so as to retrieve these packets. As previously explained, note that the CTS packets, 801, 802 and 803 are addressed to the ground based AP 120.

Figure 9:
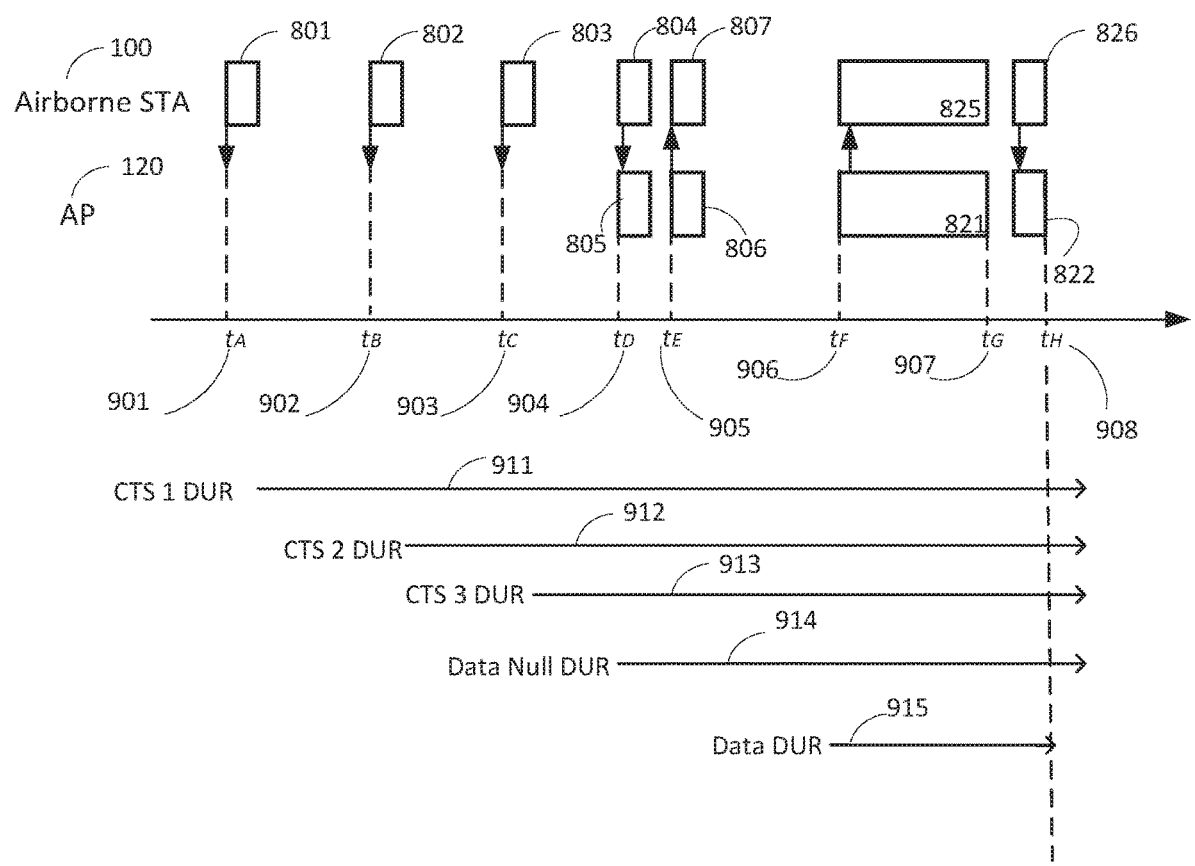
FIG. 9 is the timing diagram for FIG. 8 that shows the relative timing and setting of the duration fields for the CTS packets, the data null packet, the data packet and the ACK packet.

FIG. 9 is the timing diagram for FIG. 8 that shows the relative timing and setting of the duration fields for the CTS packets 801, 802 and 803, the data null packet 804, the data packet 821 and the ACK packet 826. Airborne station 100 transmits CTS packet 801 at time tA 901, CTS 802 at time tB 902 and CTS 803 at time tC 703. Airborne station 100 transmits data null packet 804 at time tD 904. The ground based AP 120 will transmit an Ack 806 as a response to the received data null packet 805. The other ground based networks, networks 1 to 8, 201 to 208 will not receive this Ack and hence will not reset their respective NAV times. The timing of tA 901, tB 902, tC 903 and tD 904 is under the control of airborne station 100. The gap between the data null packet 804 and the data packet 821, tD 904 to tF 906 is somewhat predictable as is the length in time of the data packet 821 and the resulting Ack packet 826. The duration 911 that is set into CTS packet 801 will be such that it extends beyond the time tG 907. In practice a relatively large duration can be used as the sole purpose is to delay traffic in the other ground networks, 201 to 208. The transmission of the Ack 826 will reset the NAV for all the ground networks as previously explained, so there is no adverse effect to setting a relatively high duration values 901, 902 and 903. For example, the duration of CTS 802 may be set to 15 ms. Then CTS 802 may be sent 1 ms after CTS packet 801, and the duration 912 of CTS 802 set to 14 ms. CTS 803 may be sent 1 ms after CTS 802, and the duration 913 of CTS 803 set to 13 ms. The data null packet 804 may be sent 1 ms after CTS 803 and the duration 914 may be set to 12 ms. The durations 911, 912, 913 and 914 need to extend beyond the time tG 907 such that there is no interference to the data packet 821 transmitted by ground based AP 120 and received as data packet 825 by airborne station 100. The data packet 821 sent by the ground based AP 120 will have a duration 915 that covers the expected Ack 826 which is transmitted by airborne station 100 but this is not received by the other ground based networks. The Ack 826 transmitted by airborne station 100 however will be received by the ground networks and hence their respective mediums will be returned to idle at time tH 908.

Figure 1:
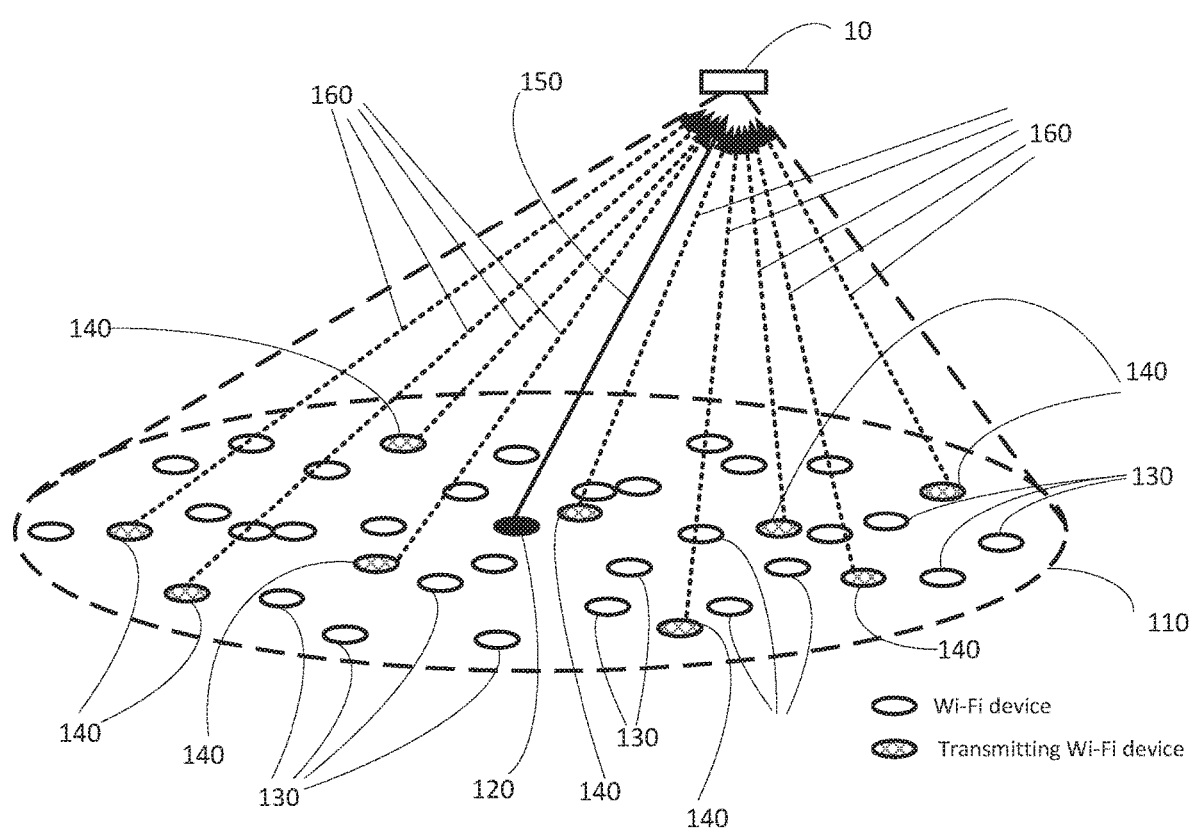
FIG. 1 is a schematic diagram depicting an airborne Wi-Fi station that is receiving transmissions from a multitude of Wi-Fi access points and station within a coverage area which is compatible with the antenna coverage of the airborne station.

As described with reference to FIGS. 1 to 9, when attempting to communicate between an airborne station 100 and a ground based AP 120 where the coverage area 110 is such that unwanted transmissions 160 from many other ground based APs and networks, 130 and 140 are being received at the airborne station 100, the transmissions from the airborne station 100 to the ground based AP 120 are generally received without interference but any transmission from the ground based AP 120 to the airborne station 100 would be subject to interference from any or all of the surrounding ground based networks, 130 and 140 as shown in FIG. 1. As described in FIGS. 5 to 9, a number of CTS transmissions from airborne station 100 are sent with relatively large duration values so as to cause all the ground based network traffic to cease such that any wanted transmission from the ground based AP 120 is received without interference at airborne station 100 be it an Ack or a data or a management packet.

Figure 10:
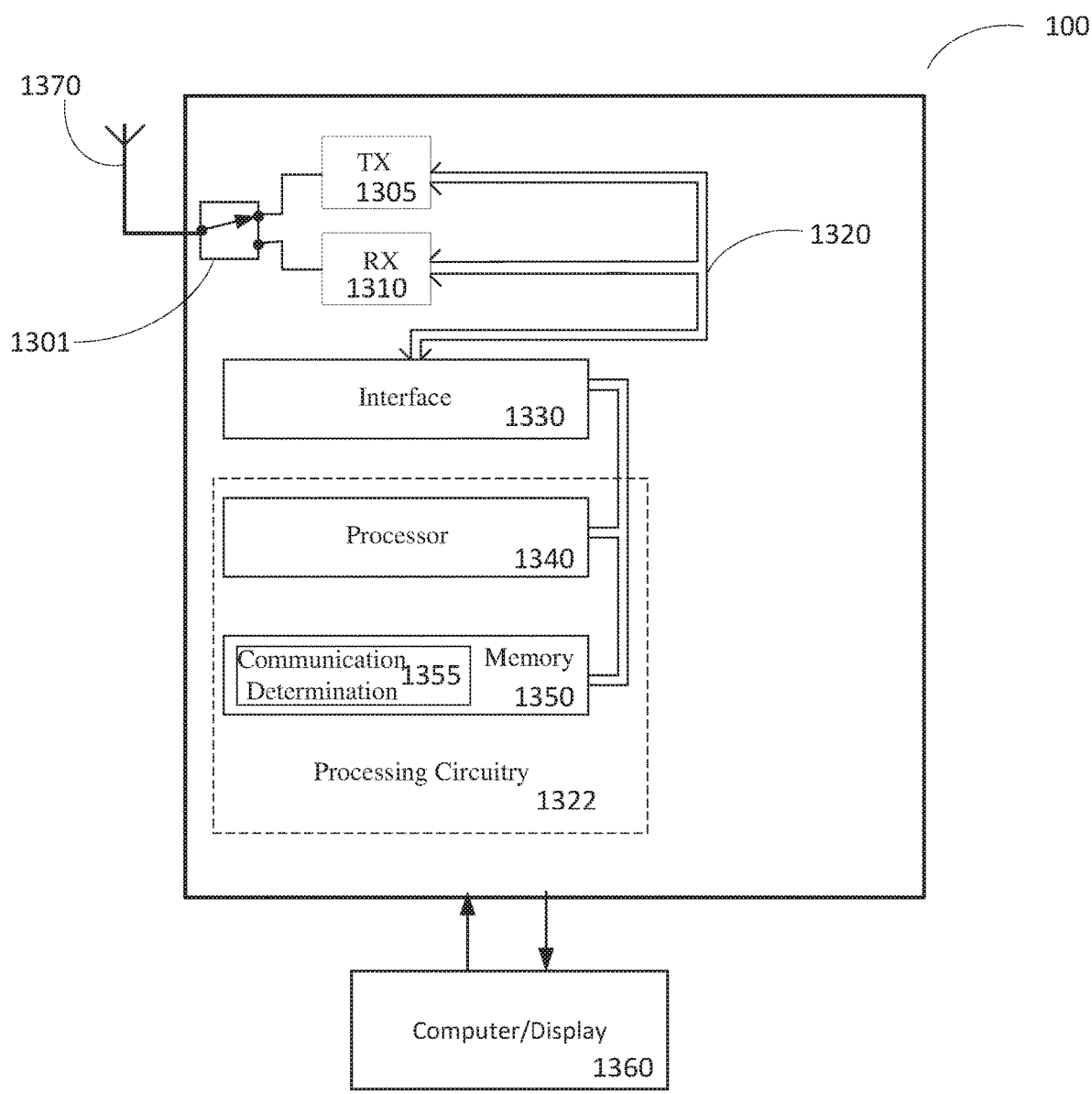
FIG. 10 illustrates a method according to an exemplary embodiment of the disclosure.

FIG. 10 is a block diagram of airborne station 100 that complies with an embodiment of this disclosure. A single antenna 1370, is connected to an RF switch 1301 which is used to connect the antenna 1370 to either the transmitter 1305, or to the receiver 1310. This embodiment of the disclosure represents an airborne station 100 that has a single transmitter 1305 that may be used to transmit packets to a specific target device, ground based AP or STA, or to send management or control packets to broadcast or specific addresses. Packets received at the antenna 1370 may be received by receiver 1310 via RF switch 1301.

Airborne station 100 may include an interface 1330, and processing circuitry 1322 having a processor 1340, and a memory 1350. The interface 1330 may act as the interface control between the processor 1340, the transmitter 1305 and the receiver 1310 to via the control bus 1320. The interface 1330 and/or the processing circuitry 1322 may include elements for constructing control, management and data packets and sending them to the transmitter 1305 for the transmission of packets via the RF switch 1301 and the antenna 1370. According to this embodiment of the disclosure, the interface 1330 and/or the processor 1340 is configured to transmit management, data and control packets and to receive input signals based upon the IEEE 802.11 standard. The processor 1340 is configured to measure and monitor input signals' attributes, including the preamble, MAC header and timing according to the IEEE 802.11 standard. Interface 1330 and/or processor 1340 is arranged to receive input signals and the processor 1340 is arranged to measure and monitor input signals' attributes, including management, data and control packets transmitted by an access point or station that is based upon the IEEE 802.11 Standard.

The interface 1330 and/or the processor 1340 may include elements for the measuring and/or calculating attributes of received signals (input signals) that are passed from the receiver 1310. The memory module 1350 may store instructions for executing any method mentioned in the specification, input signals, and results of processing of the processor 1340, signals to be outputted and the like. Airborne station 100 may include a computer/display 1360 that interfaces with the processor 1340 and may also interface with the memory module 1350. Computer/Display 1360 may be used by an operator to display the results of the operations described in this disclosure. The Computer/Display 1360 may be used to input control messages to the processor 1340 such as to starting and stopping the transmission and reception of packets as described in this disclosure.

In addition to a traditional processor and memory, processing circuitry 1322 may include integrated circuitry for processing and/or control, e.g., one or more processors and/or processor cores and/or FPGAs (Field Programmable Gate Array) and/or ASICs (Application Specific Integrated Circuitry). Processor 1340 may be configured to access (e.g., write to and/or read from) memory 1350, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 1350 may be configured to store code executable by processor 1340 and/or other data, e.g., data pertaining to communication, e.g., configuration and/or address data of nodes, etc. Memory 1350 also includes communication determination code 1355 configured to perform the processes described herein when executed, especially those described with reference to FIGS. 10-13. In other words, memory 1350 has instructions that, when executed by processor 1340, configures processor 1340 to perform the location determination processes described herein.

Figure 11:
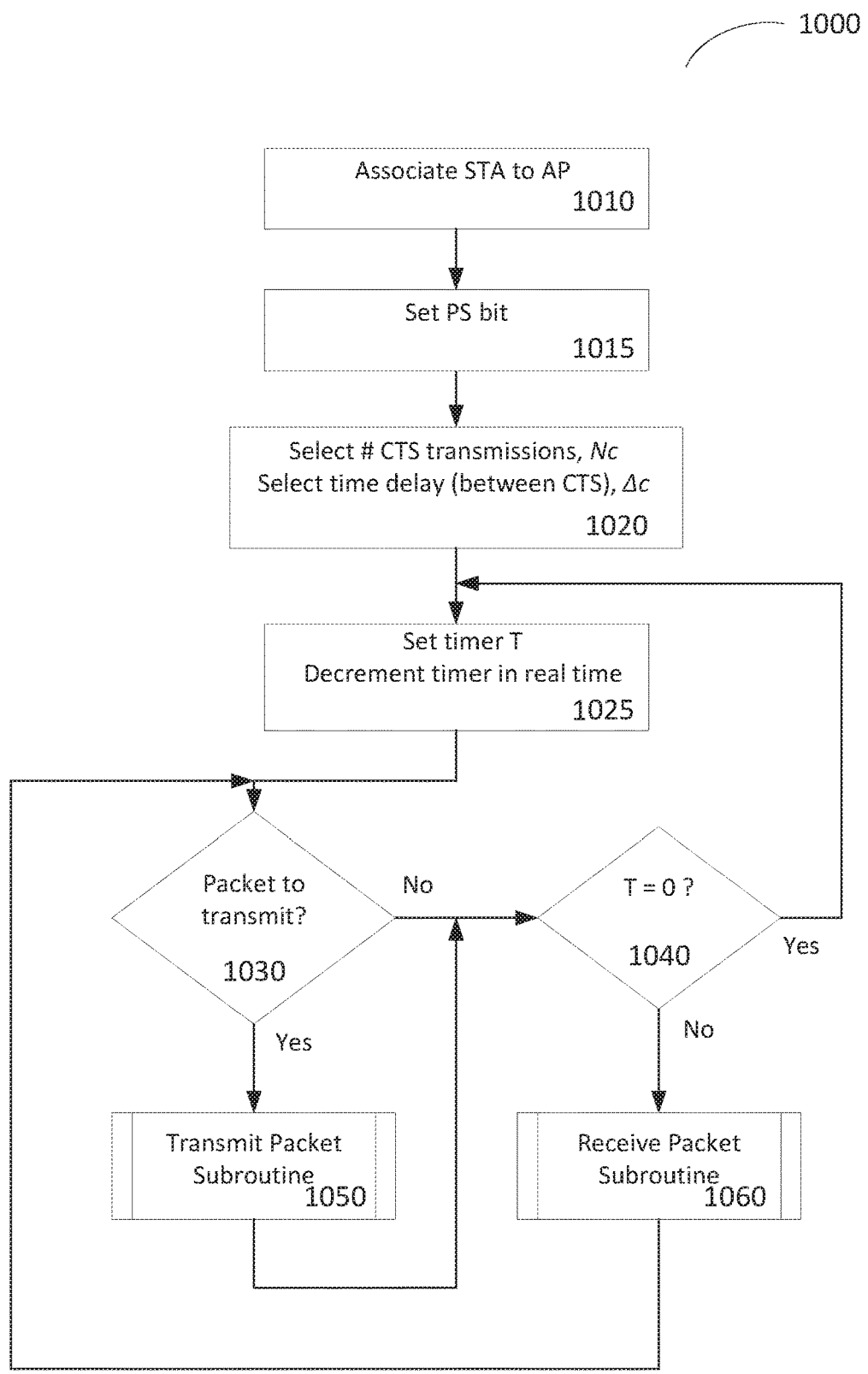
FIG. 11 illustrates a method, "transmit packet", according to an exemplary embodiment of the disclosure.

FIG. 11 illustrates method 1000 according to an exemplary embodiment of the disclosure. Method 1000 may start by step 1010 where airborne station 100 associates to ground based AP 120. The association process may include exchanges including probe request(s) and response(s), authentication request(s) and response(s), association request(s) and response(s) as well as exchanges to set the IP addresses and security keys. Step 1010 may be followed by step 1015 where airborne station 100 indicates to ground based AP 120 that it is in power save. As previously explained, airborne station 100 may set the PS bit set to 1 in any control or data (null) packet. Step 1015 may be followed by step 1020 where airborne station 100 may select two parameters: the total number of CTS transmissions to be used, Nc, and the nominal time gap, Δc, between the CTS transmissions. For example, Nc may be set to 3, and 4c, may be set to 1 millisecond or 3 milliseconds. Step 1020 may be followed by step 1025 where a timer T is set. Although, as previously explained, airborne station 100 may listen to the beacon transmissions from ground based AP 120 and detect that a packet is buffered, because of interference from other ground networks, it cannot be assured that the beacon will be received. A timer T may be used such that periodically airborne station 100 activates the receive methods as described in and with respect to FIG. 6, FIG. 7 and FIG. 8. For example, timer T may be set to 50 milliseconds. Also in step 1020, having set the timer T it is then decremented in real time. Step 1025 may be followed by step 1030 where airborne station 100 checks if a packet has been presented to the MAC for transmission. If there is a packet for transmission then step 1030 may be followed by sub routine 1050, "transmit packet" where a packet is transmitted as previously described in FIG. 5. If there is no packet for transmission, then step 1030 may be followed by step 1040 where the state of the timer T is checked. If the timer has not expired, e.g., T≥0, then step 1040 may be followed by subroutine step 1060, the "receive packet" subroutine. If the timer has expired, e.g., T=0, then step 1040 may be followed by step 1025 where the timer T is reset. "Transmit packet" subroutine 1050 may be followed by step 1040 to check if timer T has expired. "Receive packet" subroutine 1060 may be followed by step 1030 to check if a packet is ready for transmission.

Figure 12:
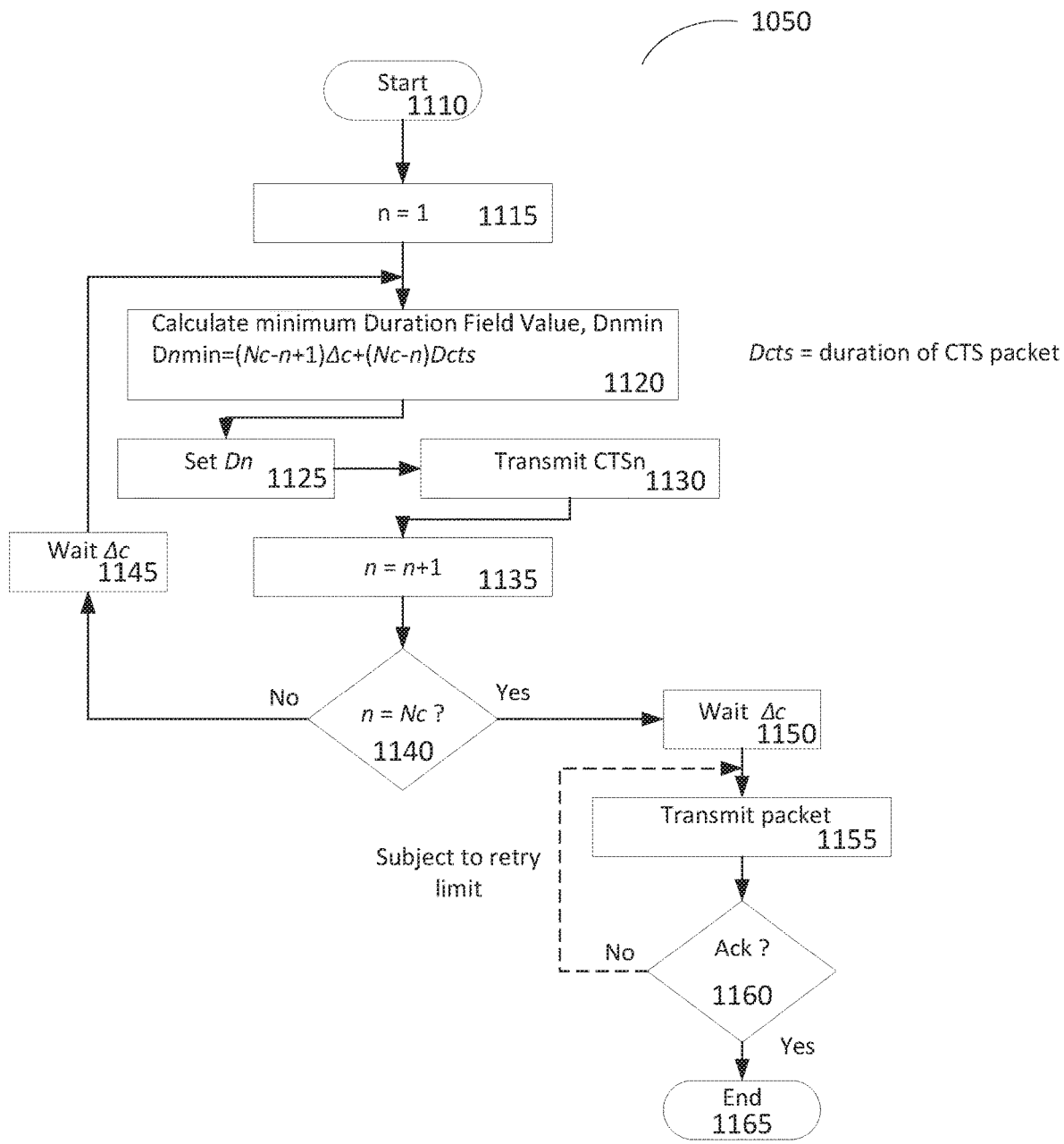
FIG. 12 illustrates a method, "receive packet", according to an exemplary embodiment of the disclosure.

FIG. 12 illustrates sub routine 1050, "transmit packet", according to an exemplary embodiment of the disclosure. Sub routine 1050 may start by step 1110. Step 1110 may be followed by step 1115 where a term n is initialized, i.e. n=1. Step 1115 may be followed by step 1120 where the minimum value, Dnmin, of the Duration field for the nth CTS transmission may be calculated.

$$Dn\ min=(Nc-n+1)\Delta c+(Nc-n)Dcts$$

Where Dcts is the duration of the CTS packet

If the data rate used for the transmissions is 1 Mb/s, then Dcts=304 µs and SIFS=10 µs. Hence if Nc=3 and Δc=1 millisecond, then for the initial CTS, n=1, the minimum value for the Duration field, Dnmin=3608. This is the minimum value for the Duration field in the first CTS packet but, as previously explained in FIG. 5 the duration values set in the CTS packets 501, 502 and 503 must extend to at least the start of the data packet 530, at time tiv 514. It is not necessary to be precise, and a larger duration value may be used without adverse consequence.

Step 1120 may be followed by step 1125 where the duration Dn to be used in the nth CTS packet is set. Step 1125 may be followed by step 1130 where the nth CTS packet is transmitted. Step 1130 may be followed by step 1135 where the value n is incremented and step 1130 may be followed by step 1140 where a check is made to compare the value of n to the maximum value Nc. If the value of n is less than Nc then step 1140 may be followed by a wait time of Δc, step 1145, after which the method returns to step 1120. If the value of n is equal to the maximum value Nc, then step 1140 may be followed by a wait time of Δc, step 1150, after which the packet is transmitted, step 1155. Step 1155 may be followed by step 1160 to receive the expected Ack response. If the Ack response is received then step 1160 may be followed by step 1165 where the subroutine ends. If the Ack response in step 1160 is not received then the method may return to step 1155 and the packet retransmitted. The standard process for transmitting and re-transmitting a packet up to a retry limit may be followed.

Figure 13:
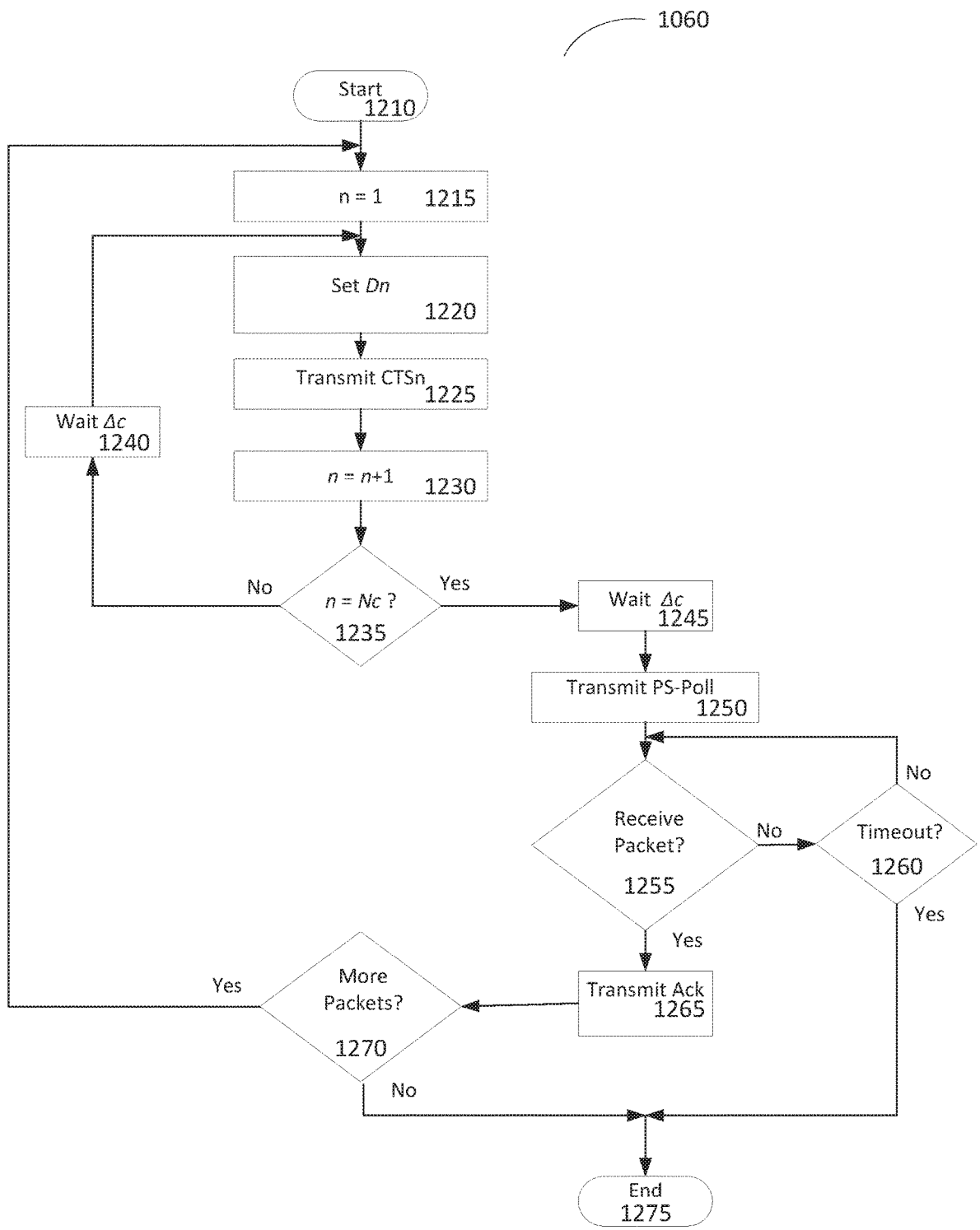
FIG. 13 illustrates an exemplary wireless communication device according to an embodiment of the disclosure that may be used as the airborne station.

FIG. 13 illustrates sub routine 1060, "receive packet", according to an exemplary embodiment of the disclosure. Sub routine 1060 may start by step 1210. Step 1210 may be followed by step 1215 where a term n is initialized, i.e. n=1. Step 1215 may be followed by step 1220 where the duration value, Dn, of the Duration field for the nth CTS transmission may be set. As previously explained in FIG. 7 the duration needs to extend beyond the time tf 706 such that there is no interference to the data packet 621 transmitted by ground based AP 120 and received as packet 625 by airborne station 100. Also, as previously explained in FIG. 6 and FIG. 7, there is no adverse effect to setting relatively high duration values in the CTS packets as the NAVs of the ground devices will be reset by the Ack transmitted by airborne station 100 in response to the received packet from ground based AP 120. Step 1220 may be followed by step 1225 where the CTS packet is transmitted. Step 1225 may be followed by step 1230 where the value n is incremented and step 1230 may be followed by step 1235 where a check is made to compare the value of n to the maximum value Nc. If the value of n is less than Nc then step 1235 may be followed by a wait time of Δc, step 1240, after which the method returns to step 1220. If the value of n is equal to the maximum value Nc, then step 1235 may be followed by a wait time of Δc, step 1245, after which a PS-Poll packet is transmitted, step 1250. As previously explained in FIG. 8 and FIG. 9 a data null packet may be used in place of the PS-Poll. Step 1250 may be followed by step 1255 where, if a packet has been buffered by the ground based AP 120, airborne station 100 may receive a packet transmitted by ground based AP 120. Airborne station 100 may wait for a timeout period, step 1260. If a packet is received than step 1255 may be followed by step 1265 where airborne station 100 transmits an Ack packet. Step 1265 may be followed by step 1270 where the header of the received packet is examined to determine if more packets are buffered. If more packets are buffered, then the method returns to step 1215. If no more packets are buffered then step 1270 may be followed by step 1275 where the subroutine ends. If the timeout in steps 1255 and 1260 is exceeded, then step 1260 may be followed by step 1275 where the subroutine ends. If the timeout is exceeded in steps 1255 and 1260, then step 1260 may be followed by step 1275 where the subroutine ends.

Figure 14:
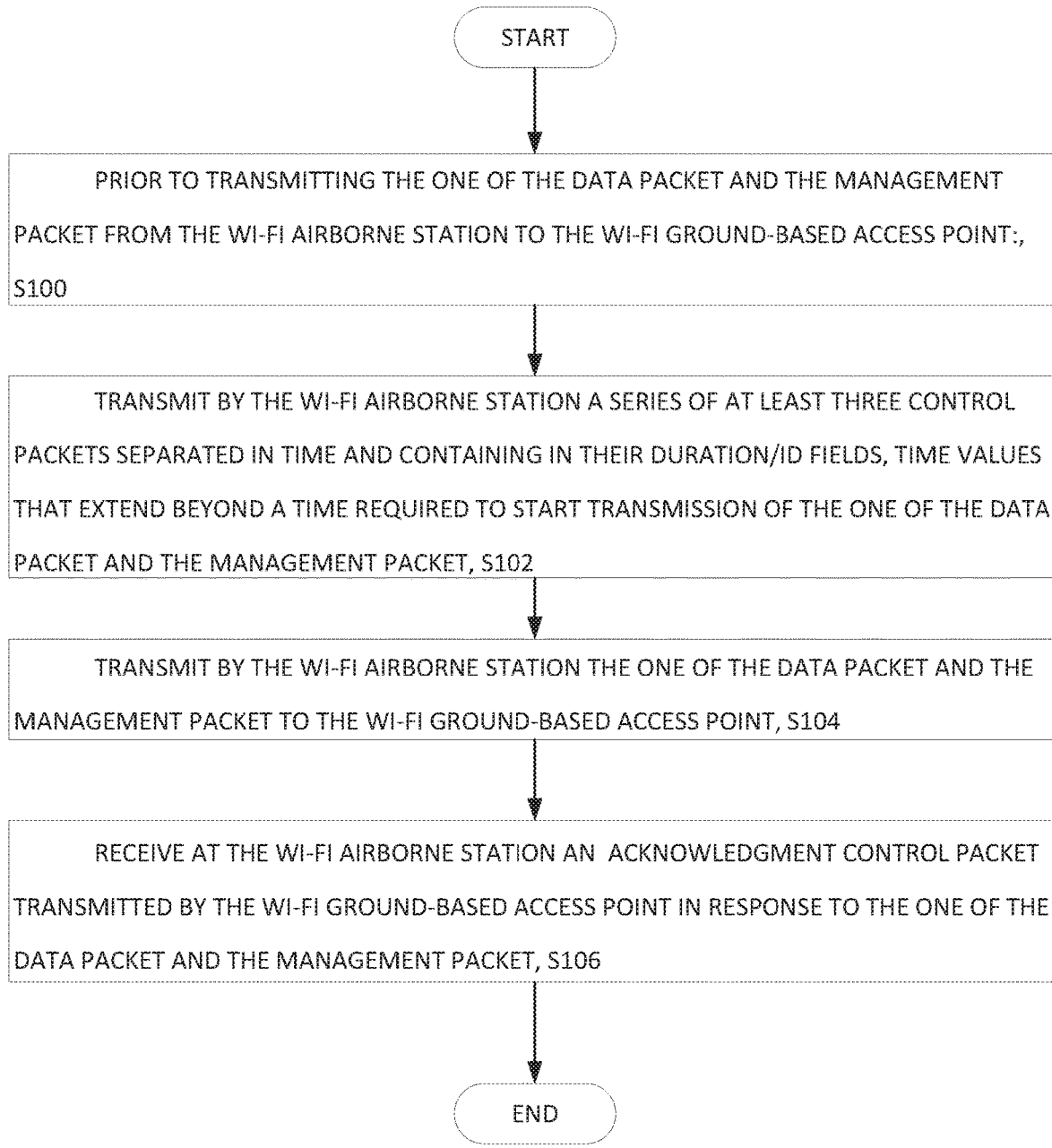
FIG. 14 is a flowchart of an exemplary process for transmitting one of a data packet and a management packet from a Wi-Fi airborne station to a Wi-Fi ground based access point.

FIG. 14 is a flowchart of an exemplary process for transmitting, via the transmitter 1305, one of a data packet and a management packet from a Wi-Fi airborne station 100 to a Wi-Fi ground based access point. The process includes, prior to transmitting the one of the data packet and the management packet from the Wi-Fi airborne station 100 to the Wi-Fi ground-based access point 120 (block S100): transmitting by the Wi-Fi airborne station 100 a series of at least three control packets separated in time and containing in their duration/ID fields, time values that extend beyond a time required to start transmission of the one of the data packet and the management packet (block S102). The process further includes transmitting by the Wi-Fi airborne station 100 the one of the data packet and the management packet to the Wi-Fi ground-based access point 120 (block S104). The process also includes receiving, via the receiver 1310, at the Wi-Fi airborne station 100 an acknowledgment control packet transmitted by the Wi-Fi ground-based access point 120 in response to the one of the data packet and the management packet (block S106).

Figure 15:
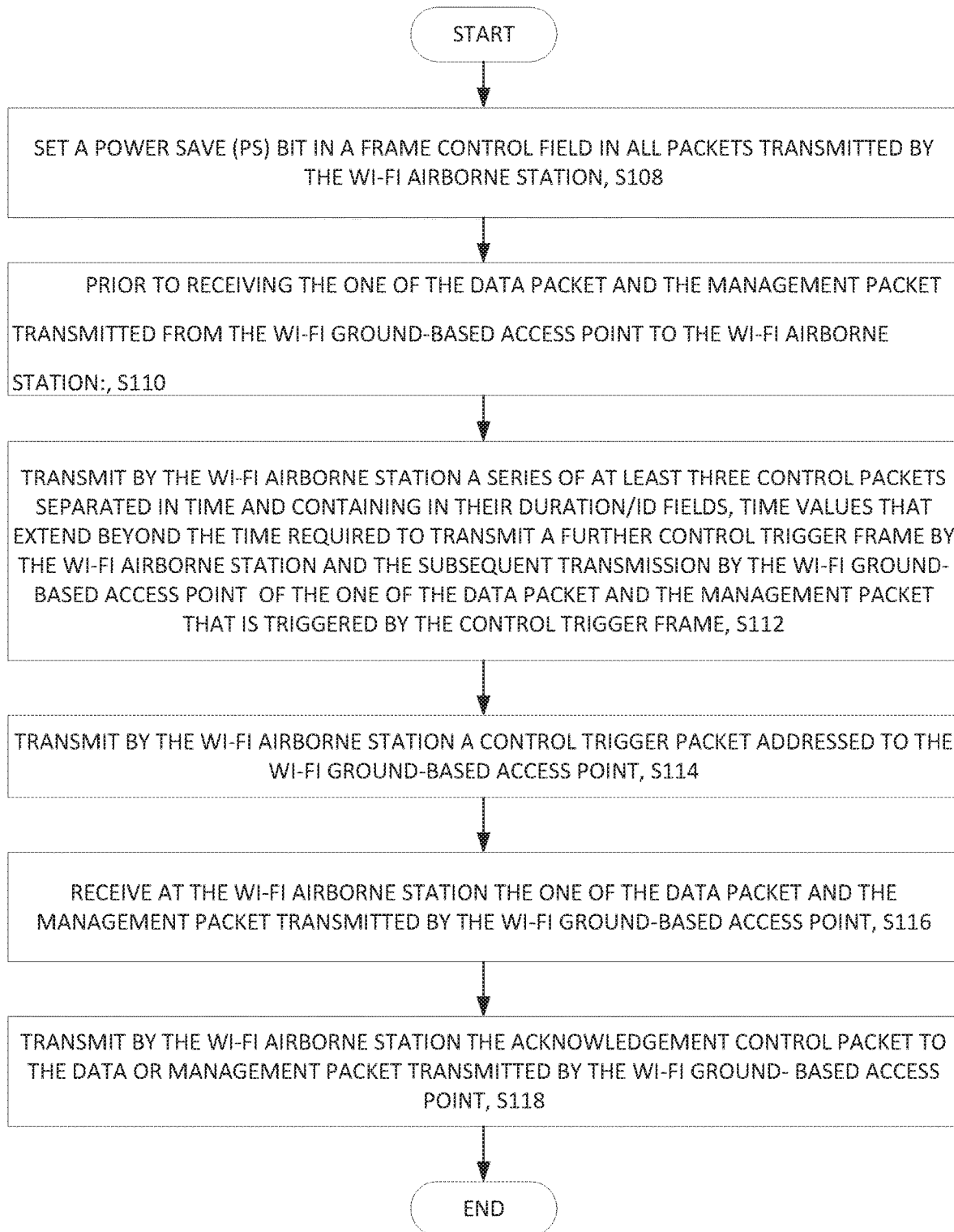
FIG. 15 is a flowchart of an exemplary process for receiving one of a data packet and a management packet transmitted from a Wi-Fi ground-based access point to a Wi-Fi airborne station.

FIG. 15 is a flowchart of an exemplary process for receiving one of a data packet and a management packet transmitted from a Wi-Fi ground-based access point 120 to a Wi-Fi airborne station 100. The process includes setting, via the processor 1340, a power save (PS) bit in a Frame Control field in all packets transmitted by the Wi-Fi airborne station (block S108). The process also includes prior to receiving, via the receiver 1310, the one of the data packet and the management packet transmitted from the Wi-Fi ground-based access point 120 to the Wi-Fi airborne station 100 (block S110), transmitting by the Wi-Fi airborne station 100 a series of at least three control packets separated in time and containing in their duration/ID fields, time values that extend beyond the time required to transmit a further control trigger frame by the Wi-Fi airborne station 100 and the subsequent transmission by the Wi-Fi ground-based access point 120 of the one of the data packet and the management packet that is triggered by the control trigger frame (block S112). The process also includes transmitting by the Wi-Fi airborne station 100 a control trigger packet addressed to the Wi-Fi ground-based access point 120 (block S114). The process further includes receiving at the Wi-Fi airborne station 100 the one of the data packet and the management packet transmitted by the Wi-Fi ground-based access point 120 (block S116). The process also includes transmitting by the Wi-Fi airborne station 100 the acknowledgement control packet to the data or management packet transmitted by the Wi-Fi ground-based access point (block S118).

While the disclosure has been described with reference to exemplary embodiment(s) it will be understood by those skilled in the art that various changes may be made and equivalents may be substituted for elements thereof without departing from the scope of the disclosure. The number of and the timing of the CTS transmissions can be varied and RTS or RTS/CTS combinations could be used without departing from the scope of the disclosure. In the case where RTS packets are used, the RTS packets may be addressed to ground based AP 120, but it is inconsequential as to whether or not the resulting CTS transmissions from ground based AP 120 are received. Similarly, the PS bit can be set in data and control frames and hence there are many variations possible other than those described for indicating to the ground based AP 120 that airborne station 100 is in power save mode. Again, these PS bit setting variations could be used without departing from the scope of the disclosure.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of CTS transmissions used prior to a PS-Poll or data transmission, the addressing of the CTS transmissions, the use of RTS or RTS/CTS combinations in place of the CTS transmissions used prior to a PS-Poll or data transmission, the use of other data or control frames to set the power save bit indication, the timing separating the CTS or RTS or RTS/CTS combinations and the data or PS-Poll packets, the values of the duration values used in the CTS or RTS or RTS/CTS combinations. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope

What is claimed is:

1. A method for transmitting one of a data packet and a management packet from a Wi-Fi airborne station to a Wi-Fi ground-based access point, the method comprising:
   prior to transmitting the one of the data packet and the management packet from the Wi-Fi airborne station to the Wi-Fi ground-based access point:
   transmitting by the Wi-Fi airborne station a series of at least three control packets separated in time and containing in their duration/ID fields, time values that extend beyond a time required to start transmission of the one of the data packet and the management packet;
   transmitting by the Wi-Fi airborne station the one of the data packet and the management packet to the Wi-Fi ground-based access point; and
   receiving at the Wi-Fi airborne station an acknowledgment control packet transmitted by the Wi-Fi ground-based access point in response to the one of the data packet and the management packet.

2. The method of claim 1, wherein a power save (PS) bit in a Frame Control field is set in all packets transmitted by the Wi-Fi airborne station.

3. The method of claim 1, wherein the control packets transmitted by the Wi-Fi airborne station are clear to send (CTS) control packets.

4. The method of claim 3, wherein the CTS control packets transmitted by the Wi-Fi airborne station are addressed to the Wi-Fi ground-based access point.

5. The method of claim 1, wherein the control packets transmitted by the Wi-Fi airborne station are ready to send (RTS) packets addressed to the Wi-Fi ground-based access point.

6. The method of claim 1, wherein the control packets transmitted by the Wi-Fi airborne station are a mixture of clear to send (CTS) packets addressed to either one of the Wi-Fi airborne station and the Wi-Fi ground-based access point and ready to send (RTS) packets addressed to the Wi-Fi ground-based access point.

7. A method for receiving one of a data packet and a management packet transmitted from a Wi-Fi ground-based access point to a Wi-Fi airborne station, the method comprising:
setting a power save (PS) bit in a Frame Control field in all packets transmitted by the Wi-Fi airborne station;
prior to receiving the one of the data packet and the management packet transmitted from the Wi-Fi ground-based access point to the Wi-Fi airborne station:
transmitting by the Wi-Fi airborne station a series of at least three control packets separated in time and containing in their duration/ID fields, time values that extend beyond the time required to transmit a further control trigger frame by the Wi-Fi airborne station and the subsequent transmission by the Wi-Fi ground-based access point of the one of the data packet and the management packet that is triggered by the control trigger frame; and
transmitting by the Wi-Fi airborne station a control trigger packet addressed to the Wi-Fi ground-based access point;
receiving at the Wi-Fi airborne station the one of the data packet and the management packet transmitted by the Wi-Fi ground-based access point; and
transmitting by the Wi-Fi airborne station an acknowledgement control packet in response to the data or management packet transmitted by the Wi-Fi ground-based access point.

8. The method of claim 7, wherein the control trigger packet transmitted by the Wi-Fi airborne station addressed to the Wi-Fi ground-based access point is a PS-Poll.

9. The method of claim 7, wherein the control trigger packet transmitted by the Wi-Fi airborne station addressed to the Wi-Fi ground-based access point is a data null.

10. The method of claim 7, wherein the control packets transmitted by the Wi-Fi airborne station are clear to send (CTS) control packets.

11. The method of claim 10, wherein the CTS control packets transmitted by the Wi-Fi airborne station are addressed to the Wi-Fi ground-based access point.

12. The method of claim 7, wherein the control packets transmitted by the Wi-Fi airborne station are ready to send (RTS) packets addressed to the Wi-Fi ground-based access point.

13. The method of claim 7, wherein the control packets transmitted by the Wi-Fi airborne station are a mixture of clear to send (CTS) packets addressed to either one of the Wi-Fi airborne station and the Wi-Fi ground-based access point and ready to send (RTS) packets addressed to the Wi-Fi ground-based access point.

14. A Wi-Fi airborne station for transmitting one of a data packet and a management packet to a Wi-Fi ground-based access point, the Wi-Fi airborne station comprising:
a memory configured to store the one of the data packet and the management packet; and
processing circuitry configured to:
prior to transmitting the one of the data packet and the management packet from the Wi-Fi airborne station to the Wi-Fi ground-based access point, transmit by the Wi-Fi airborne station a series of at least three control packets separated in time and containing in their duration/ID fields, time values that extend beyond a time required to start transmission of the one of the data packet and the management packet;
transmit by the Wi-Fi airborne station the one of the data packet and the management packet to the Wi-Fi ground-based access point; and
receive at the Wi-Fi airborne station an acknowledgment control packet transmitted by the Wi-Fi ground-based access point in response to the one of the data packet and the management packet.

15. The Wi-Fi airborne station of claim 14, wherein a power save (PS) bit in a Frame Control field is set in all packets transmitted by the Wi-Fi airborne station.

16. The Wi-Fi airborne station of claim 14, wherein the control packets transmitted by the Wi-Fi airborne station are clear to send (CTS) control packets.

17. The Wi-Fi airborne station of claim 16, wherein the CTS control packets transmitted by the Wi-Fi airborne station are addressed to the Wi-Fi ground-based access point.

18. The Wi-Fi airborne station of claim 14, wherein the control packets transmitted by the Wi-Fi airborne station are ready to send (RTS) packets addressed to the Wi-Fi ground-based access point.

19. The Wi-Fi airborne station of claim 14, wherein the control packets transmitted by the Wi-Fi airborne station are a mixture of clear to send (CTS) packets addressed to either one of the Wi-Fi airborne station and the Wi-Fi ground-based access point and ready to send (RTS) packets addressed to the Wi-Fi ground-based access point.

20. The Wi-Fi airborne station of claim 14, wherein before the acknowledgement control packet is transmitted by the Wi-Fi ground-based access point, a power save (PS) poll packet is transmitted to the Wi-Fi ground-based access point.

* * * * *